(12) United States Patent
Eigel

(10) Patent No.: US 11,091,089 B2
(45) Date of Patent: Aug. 17, 2021

(54) EMERGENCY ASSISTANCE SYSTEM WITH ACOUSTIC EXTERNAL WARNING

(71) Applicant: VOLKSWAGEN AKTIENGESELLSCHAFT, Wolfsburg (DE)

(72) Inventor: Thomas Eigel, Berlin (DE)

(73) Assignee: Volkswagen Aktiengesellschaft

( * ) Notice: Subject to any disclaimer, the term of this patent is extended or adjusted under 35 U.S.C. 154(b) by 0 days.

(21) Appl. No.: 16/938,302

(22) Filed: Jul. 24, 2020

(65) Prior Publication Data
US 2021/0023986 A1 Jan. 28, 2021

(30) Foreign Application Priority Data
Jul. 24, 2019 (DE) .................... 10 2019 210 979.9

(51) Int. Cl.
*B60Q 1/52* (2006.01)
*B60Q 1/00* (2006.01)
*B60Q 5/00* (2006.01)

(52) U.S. Cl.
CPC ........... *B60Q 1/525* (2013.01); *B60Q 1/0023* (2013.01); *B60Q 5/006* (2013.01)

(58) Field of Classification Search
CPC ...... B60Q 1/525; B60Q 1/0023; B60Q 5/006; B60Q 5/00; B60Q 1/52
USPC .............................. 340/425.5, 463, 471, 474
See application file for complete search history.

(56) References Cited

U.S. PATENT DOCUMENTS

| 6,763,292 | B1 | 7/2004 | Smith et al. |
| 8,473,171 | B2 * | 6/2013 | Zagorski ............... G08G 1/167 |
| | | | 701/70 |
| 9,150,200 | B2 | 10/2015 | Urhahne |
| 9,227,631 | B2 | 1/2016 | Kammel et al. |
| 9,849,875 | B2 | 12/2017 | Hauler et al. |
| 10,268,194 | B2 | 4/2019 | Noessner et al. |
| 10,569,649 | B2 | 2/2020 | Munaoka et al. |
| 2003/0025597 | A1 * | 2/2003 | Schofield ............. G06K 9/6267 |
| | | | 340/435 |
| 2005/0029864 | A1 | 2/2005 | Bauer et al. |
| 2009/0192666 | A1 | 7/2009 | Trippler |
| 2015/0006012 | A1 * | 1/2015 | Kammel ............... B60W 50/14 |
| | | | 701/23 |
| 2015/0203126 | A1 * | 7/2015 | Kobana .................. B60K 28/06 |
| | | | 701/93 |
| 2016/0035222 | A1 | 2/2016 | Mikuni et al. |
| 2017/0021768 | A1 * | 1/2017 | Jaegal .................... B60Q 1/525 |
| 2018/0257563 | A1 * | 9/2018 | Kodama ............... B60Q 9/008 |
| 2019/0283579 | A1 * | 9/2019 | Munaoka ............... B60Q 1/525 |

FOREIGN PATENT DOCUMENTS

| DE | 10146777 A1 | 4/2003 |
| DE | 10240018 A1 | 3/2004 |
| DE | 102006039183 A1 | 3/2008 |
| DE | 102010042432 A1 | 4/2012 |

(Continued)

*Primary Examiner* — Eric Blount
(74) *Attorney, Agent, or Firm* — Barnes & Thornburg LLP

(57) ABSTRACT

A method for operating a transportation vehicle that includes an emergency assistance system to issue a warning signal to the surroundings of the transportation vehicle based on a risk factor in the presence of initial indications of no longer sufficiently guaranteed human or technical control of the transportation vehicle.

17 Claims, 2 Drawing Sheets

(56) References Cited

FOREIGN PATENT DOCUMENTS

| | | |
|---|---|---|
| DE | 102010056187 A1 | 6/2012 |
| DE | 102011086241 A1 | 5/2013 |
| DE | 102012008090 A1 | 10/2013 |
| DE | 102012206725 A1 | 10/2013 |
| DE | 102012215952 A1 | 3/2014 |
| DE | 102012013602 A1 | 4/2014 |
| DE | 102013211607 A1 | 12/2014 |
| DE | 112015003856 T5 | 5/2017 |
| DE | 102015226217 A1 | 6/2017 |
| EP | 2878507 A1 | 6/2015 |
| EP | 3239959 A1 | 11/2017 |

* cited by examiner

EMERGENCY ASSISTANCE SYSTEM WITH ACOUSTIC EXTERNAL WARNING

PRIORITY CLAIM

This patent application claims priority to German Patent Application No. 10 2019 210 979.9, filed 24 Jul. 2019, the disclosure of which is incorporated herein by reference in its entirety.

SUMMARY

Illustrative embodiments relate to a method for the operation of a transportation vehicle, an emergency assistance system, and a transportation vehicle.

BRIEF DESCRIPTION OF THE DRAWINGS

Disclosed embodiments are explained below based on the associated drawings. In the figures.

DETAILED DESCRIPTION

Figure 1:
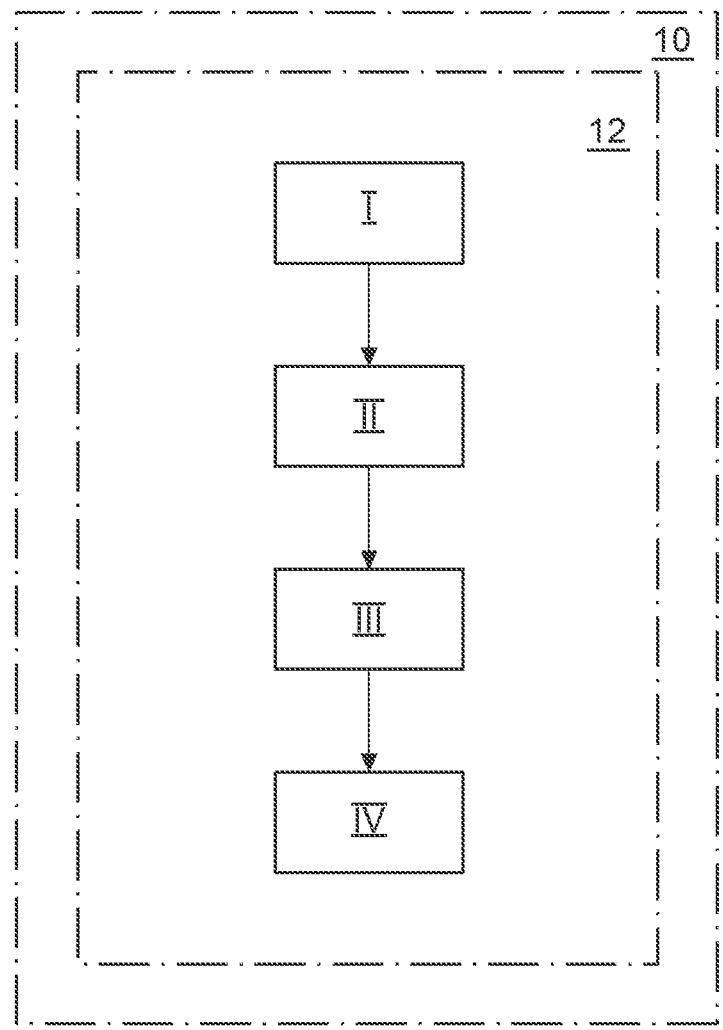
FIG. 1 shows a schematic sequence of an exemplary method.

Various emergency assistance systems are known in the technical field of transportation vehicles.

For example, a method is known from DE 10 2015 226 217 A1 in which a situational triggering of emergency braking and a lateral exit from the traffic take place. At the same time, warning signals such as flashing or horns are used.

DE 102 40 018 B4 describes a method in which a transportation vehicle evaluates its driving and environmental situation and determines a probability of collision with a detected obstacle. If the probability is above a certain values, a warning signal is issued to the surroundings.

Finally, DE 10 2010 056 187 A1 discloses a method in which a transportation vehicle identifies an imminent danger and the transportation vehicle issues a warning signal to signal hazard braking.

However, the known systems only react when hazard braking has already become necessary or at least a collision is imminent.

The disclosed embodiments provide an emergency assistance system, which significantly increases the forewarning time with which a warning signal can be issued to the surroundings and does not wait until one of the above-mentioned critical situations occurs.

A first exemplary embodiment relates to a method for the operation of a transportation vehicle, including:

Examining the operational state of the transportation vehicle by an emergency assistance system for characteristics corresponding to at least an imminent loss of control over the transportation vehicle, Determining a risk factor, at least from identified characteristics; and Issuing a warning signal to the surroundings of the transportation vehicle if the risk factor has a presumed minimum value.

The concept of imminent loss of control already includes the existence of initial evidence of possible no longer sufficiently guaranteed human or technical control over the driving behavior of the transportation vehicle.

Thus, in the disclosed method a response can already be made at the first signs of an inability to drive. It is not absolutely necessary that there must have already been a de facto uncontrolled impact on driving behavior to an extent that is relevant to road safety. Also, the disclosed method does not necessarily presuppose that for a warning signal to be issued an obstacle must have already been detected with which a collision is imminent or that emergency braking is already prepared or initiated, for example.

Compared to conventional methods, the forewarning time of other road users with the warning signal is therefore significantly reduced.

The person skilled in the art is familiar with technical diagnostic solutions, with which when selecting relevant evaluation criteria the indicators can be transferred into the risk factor. The risk factor then includes an indication of the extent to which a loss of control is possible, probable, or certain.

An example of circumstantial evidence with a potentially long lead time before a de facto occurrence of uncontrolled effects on driving behavior may be that a driver has a delayed reaction to stimuli from the environment, for example, compared to his previous behavioral profile. The stimuli may, for example, come from other transportation vehicles, objects, other road users, lane lines, light signals, or signs. This may be due, for example, to an acute health disorder or exhaustion. A de facto occurrence of uncontrolled effects on driving behavior to a road safety-relevant extent can occur here, but it does not have to occur.

An example with a probably shorter lead time of the indicators before a de facto occurrence of uncontrolled effects on driving behavior may be that a technical monitoring system of the transportation vehicle detects a fault, for example, of a steering assistance system. The detected fault can be a loss of voltage or hydraulic pressure, for example. A de facto occurrence of uncontrolled effects on driving behavior to a traffic safety-relevant extent can occur here with increased probability, depending on the extent of the fault.

An example with a probably very short lead time of the indicator before an actual loss of control may be that a driver has become incapacitated and is no longer able to actively intervene in the traffic situation. Here, for example, acute unconsciousness of a driver, which will almost certainly lead to a de facto occurrence of uncontrolled effects on driving behavior to a traffic safety-relevant extent, can be registered in known ways.

In an exemplary embodiment of the disclosed method, it is provided that additional factors are included in determining the risk factor, the presence of which increases the risk in the event of a loss of control over the transportation vehicle.

This facilitates the possibility of preventively detecting and preventing dangerous situations. The sensitivity of the detection of dangerous situations is significantly increased on the basis of the characteristics in combination with the additional factors.

In a further exemplary embodiment of the disclosed method, it is provided that the presumed minimum value is set higher than without including the additional risk factors.

Although the higher sensitivity described above is generally considered to be positive, it also increases the risk of false alarms. In that regard, it is beneficial to carry out the assessment of the relevance of a situation more selectively. By increasing the minimum value, a greater contribution of the characteristics and additional factors to forming the risk factor is necessary in this sense.

In a further exemplary embodiment of the disclosed method, it is provided that the additional factors are selected from the group: state or behavior of objects in the near field of the transportation vehicle; position of the transportation vehicle with regard to risky points of the route; state or behavior of objects on a planned route of the transportation vehicle.

Thus, for example, false alarms can be avoided, and at the same time the reliability of detection can be increased, as a result of only including actually relevant situations as factors in the risk factor.

High risk points of the route can be formed, for example, by a road junction that the transportation vehicle is approaching.

The state or behavior of objects in the near field of the transportation vehicle may relate to detected objects on the roadway or another transportation vehicle and its maneuvers, for example. In the disclosed embodiments, the near field of the transportation vehicle includes everything that can be directly captured with the transportation vehicle's own sensors.

For example, the state or the behavior of objects on a planned route of the transportation vehicle may relate to congestion information, for example.

In a further exemplary embodiment of the disclosed method, it is provided that a state or behavior of objects in the near field of the transportation vehicle is detected by environmental sensors of the transportation vehicle. The environmental sensors may include, for example, distance sensors or cameras.

In a further exemplary embodiment of the disclosed method, it is provided that a position of the transportation vehicle in relation to risky points of the route and/or a state or behavior of objects on a planned route of the transportation vehicle is determined from map material and/or swarm data.

For example, data from a navigation system or information on the traffic situation transmitted by other transportation vehicles can be used.

In a further exemplary embodiment of the disclosed method, it is provided that the warning signal includes an acoustic warning signal or a visual warning signal.

A combination of acoustic and visual warning signals can also be chosen to increase safety.

In a further exemplary embodiment of the disclosed method, it is provided that the warning signal is activated before an automatic safety intervention in a dynamic operating state of the transportation vehicle takes place.

Appropriately, the automatic safety intervention takes place no later than when the driving behavior is impaired to a degree relevant to traffic safety or when a loss of control has been detected.

Another exemplary embodiment relates to an emergency assistance system for a transportation vehicle, which is designed to perform a disclosed method according to the previous description.

Another exemplary embodiment relates to a transportation vehicle comprising an emergency assistance system according to the method and according to the previous description.

The transportation vehicle can be a land or water vehicle.

Unless otherwise stated in this application, the various disclosed embodiments referred to in this application can be combined with each other.

FIG. 1 shows a schematic sequence of a disclosed method, in which a transportation vehicle 10 is operated as described in detail below. The transportation vehicle 10 comprises an emergency assistance system 12 for this purpose. The transportation vehicle 10 and the emergency assistance system 12 are described in more detail in FIG. 2.

In FIG. 1, the performed operations of the method are first explained, symbolized by a flow chart.

In a first operation at I, the emergency assistance system 12 is used to investigate the operating state of the transportation vehicle 10. The operating state includes in particular driving dynamics variables, such as position, speed and acceleration of the transportation vehicle and may also include operating variables with regard to actuation of actuators of the transportation vehicle 10 by a driver. Examples of such operating variables would be steering movements or the actuation of pedals.

While the emergency assistance system 12 captures the operating state, in a second operation at II it searches for characteristics that correspond to at least imminent loss of control over the transportation vehicle 12. For example, in operation at I the emergency assistance system 12 captures road markings and a trajectory of the transportation vehicle 10 relative thereto. The steering behavior of the driver is also continuously recorded and the reaction time and the intensity with which the driver reacts on average to changes in the relative position of the transportation vehicle 10 and the road marking by steering movements are determined.

In operation at II, for example, momentary deviations of the driver from his usual steering behavior are captured as characteristics. These may indicate an inability to drive occurring, for example.

In a third operation at III, a risk factor is determined taking into account the identified characteristics.

To make the risk factor more meaningful, an optional attempt can be made to provoke a driver's reaction, for example, by creating a shaking effect on the steering wheel. If the driver does not react, there is another indication of inability to drive, which is then incorporated into the risk factor with a risk-increasing effect.

Furthermore, additional factors can be optionally included in the determination of the risk factor, the presence of which increases the risk in the event of a loss of control over the transportation vehicle.

Purely as an example, in the present case it can be detected, for example, in data from a navigation system 14, that the transportation vehicle 10 is moving towards a risky point of the route, for example, a nearby road junction.

If this occurs with a salient driving behavior of the driver or even where a reaction of the driver cannot be provoked even in response to additional stimuli, a very high risk can be assumed, even if in fact no effect directly affecting road safety has yet occurred.

On such a basis, in the disclosed method in a fourth operation at IV a warning signal is issued to the surroundings of the transportation vehicle 10 if the risk factor has a presumed minimum value. In the case described above, the minimum value exists due to the many indications of a loss of control that has already occurred.

In other examples, the person skilled in the art determines the minimum value and the contributions of the characteristics and additional factors to the risk factor using expert discretion.

In the present example, the warning signal is issued as an acoustic warning signal to warn any road users at the crossroads at an early stage.

The inclusion of the different characteristics and factors results in the sensitivity of the emergency assistance system 12 being significantly increased. To reduce the likelihood of false alarms, the presumed minimum required value of the risk factor can be set higher than for the case without including the additional risk factors, for example.

Here too, the person skilled in the art determines the sensitivity profile which he considers appropriate for the emergency assistance system 12 using expert discretion.

Issuing the warning signal can also be combined with an automatic safety intervention in a dynamic operating state of the transportation vehicle 10, for example, as emergency braking.

Figure 2:
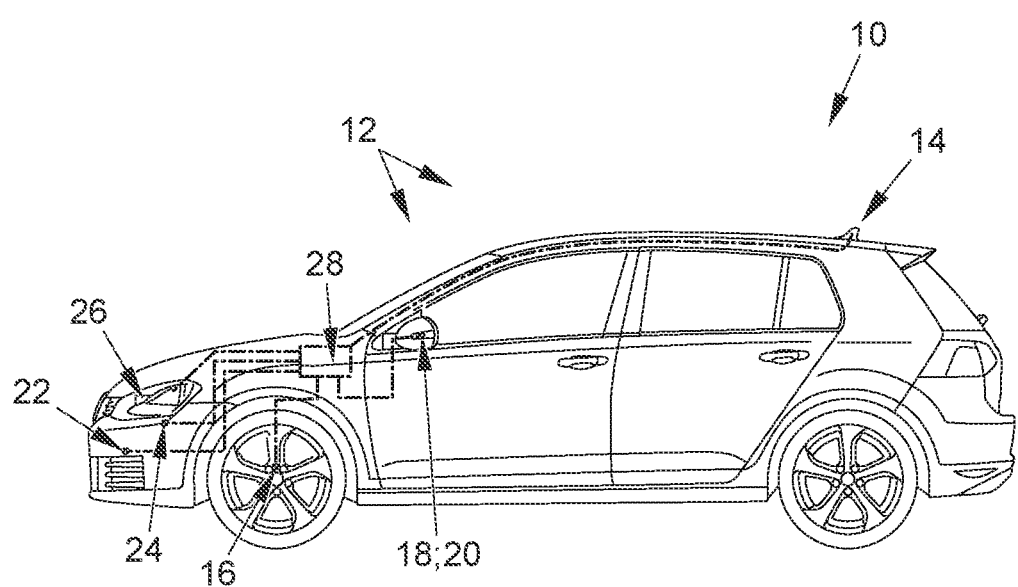
FIG. 2 shows an exemplary transportation vehicle with an exemplary emergency assistance system.

FIG. 2 shows a transportation vehicle 10 with an exemplary emergency assistance system 12.

The emergency assistance system 12 can operatively connect a number of technical systems of the transportation vehicle 10 to each other.

For example, the emergency assistance system 12 can include speed sensors 16 and steering sensors 18 as well as possibly steering wheel actuators 20.

Other technical systems may be present as a navigation system 14 or even as an environmental sensor system 22.

For issuing the warning signal, the emergency assistance system 12 comprises a horn 24 and headlights 26 of the transportation vehicle 10, for example.

Furthermore, the emergency assistance system 12 may be connected to an emergency braking system that is not shown here.

The different systems are connected to each other via a common control unit 28, for example.

REFERENCE CHARACTER LIST

10 Transportation vehicle
12 Emergency assistance system
14 Navigation system
16 Speed sensor
18 Steering sensor
20 Steering wheel actuator
22 Environmental sensor system
24 Horn
26 Headlights
28 Control unit
I Operation of the method
II Operation of the method
III Operation of the method
IV Operation of the method

The invention claimed is:

1. An emergency assistance system for a transportation vehicle, the system comprising:
at least one speed sensor; and
at least one steering sensor,
wherein the emergency assistance system operatively connects a plurality of technical systems of the transportation vehicle to each other,
wherein the emergency assistance system examines the operational state of the transportation vehicle to recognize characteristics corresponding to at least an imminent loss of control of the transportation vehicle, determines a risk factor based on the recognized characteristics, and issues a warning signal to the surroundings of the transportation vehicle in response to the risk factor having a presumed minimum value, and
wherein the recognized characteristics include a comparison of a current reaction of a driver to stimuli compared to a previous behavioral profile of the driver that indicates that the current reaction of the driver is delayed.

2. The system of claim 1, wherein the risk factor is determined based on additional factors that indicated increased risk in response to a loss of control over the transportation vehicle.

3. The system of claim 1, wherein the presumed minimum value is set lower than when the presumed minimum value is set while taking into account the additional risk factors.

4. The system of claim 1, wherein the additional factors are selected from the group comprising state or behavior of objects in the near field of the transportation vehicle, position of the transportation vehicle with regard to risky points of the route, state or behavior of objects on a planned route of the transportation vehicle.

5. The system of claim 4, wherein a state or behavior of objects in the near field of the transportation vehicle is captured with environmental sensors of the transportation vehicle.

6. The system of claim 4, wherein a position of the transportation vehicle is determined with regard to risk points of the route and/or a state or behavior of objects on a planned route of the transportation vehicle is determined from map material and/or swarm data.

7. The system of claim 1, wherein the warning signal contains an acoustic warning signal or a visual warning signal.

8. The system of claim 1, wherein the warning signal is activated before an automatic safety intervention takes place while the transportation vehicle is in a dynamic operating state.

9. A transportation vehicle comprising the emergency assistance system of claim 1.

10. A method for the operation of a transportation vehicle, the method comprising:
examining the operational state of the transportation vehicle by an emergency assistance system to recognize characteristics corresponding to at least an imminent loss of control over the transportation vehicle;
determining a risk factor based on the recognized characteristics; and
issuing a warning signal to the surroundings of the transportation vehicle in response to the risk factor having a presumed minimum value, and
wherein the additional factors include a comparison of a current reaction of a driver to stimuli compared to a previous behavioral profile of the driver that indicates that the current reaction of the driver is delayed.

11. The method of claim 10, wherein the risk factor is determined based on additional factors that indicated increased risk in response to a loss of control over the transportation vehicle.

12. The method of claim 10, further comprising setting the presumed minimum value, wherein the presumed minimum value is set lower than when the presumed minimum value is set while taking into account the additional risk factors.

13. The method of claim 10, further comprising selecting the additional factors from the group comprising state or behavior of objects in the near field of the transportation vehicle, position of the transportation vehicle with regard to risk points of the route, and state or behavior of objects on a planned route of the transportation vehicle.

14. The method of claim 13, wherein a state or behavior of objects in the near field of the transportation vehicle is captured with environmental sensors of the transportation vehicle.

15. The method of claim 13, wherein a position of the transportation vehicle is determined with regard to risk points of the route and/or a state or behavior of objects on a planned route of the transportation vehicle is determined from map material and/or swarm data.

16. The method of claim 10, wherein the warning signal contains an acoustic warning signal or a visual warning signal.

17. The method of claim 10, wherein the warning signal is activated before an automatic safety intervention takes place while the transportation vehicle is in a dynamic operating state.

* * * * *